INVENTOR.
JABEZ R. BACON
BY
ATTORNEYS.

June 5, 1962 J. R. BACON 3,037,892
MANUFACTURE OF LAMINATED PANELS
Filed Feb. 3, 1958 4 Sheets-Sheet 2
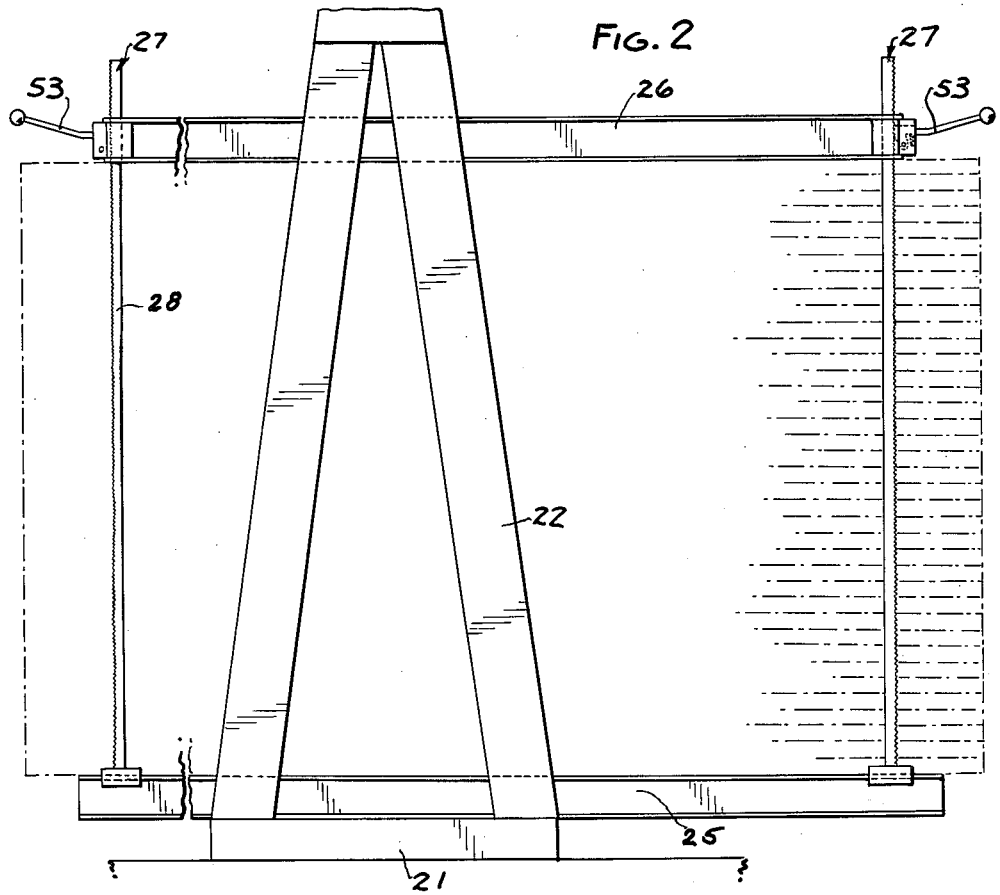
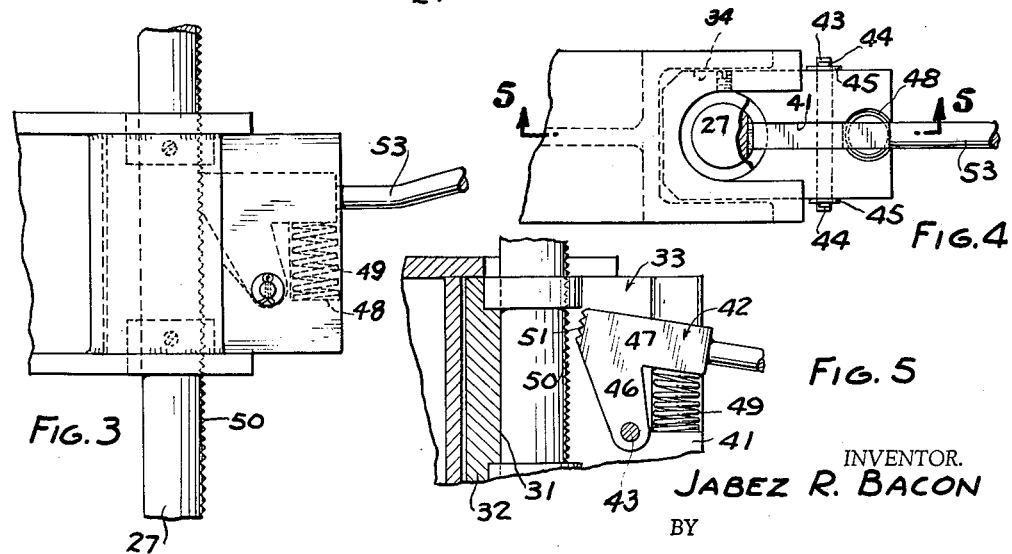
INVENTOR.
JABEZ R. BACON
BY
ATTORNEYS.

June 5, 1962  J. R. BACON  3,037,892
MANUFACTURE OF LAMINATED PANELS
Filed Feb. 3, 1958  4 Sheets-Sheet 3
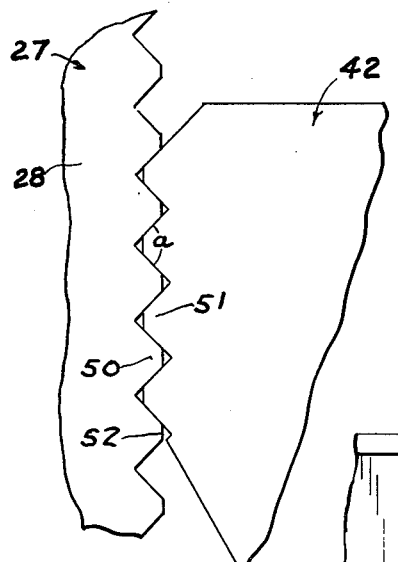
FIG. 6
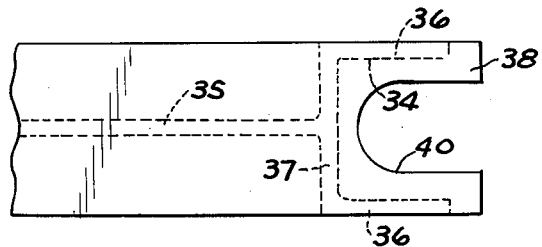
FIG. 7
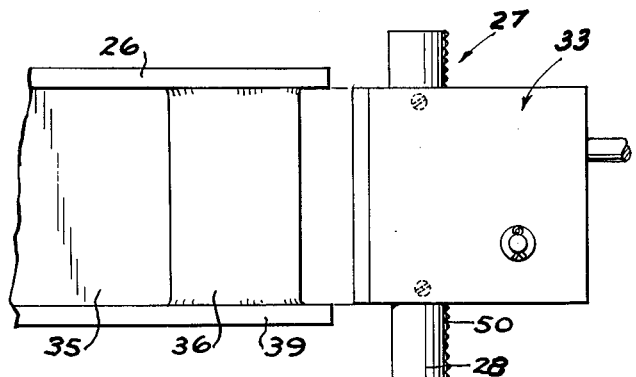
FIG. 8
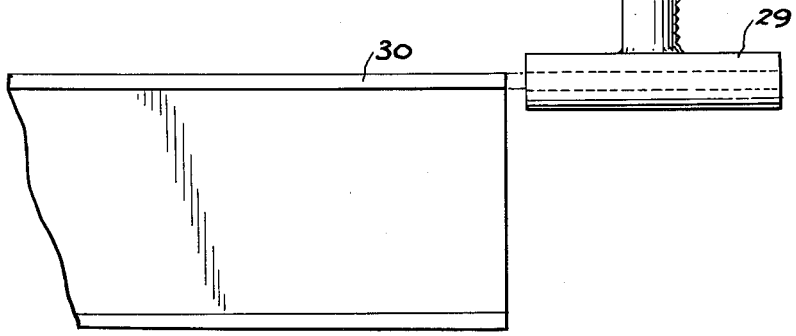
INVENTOR.
JABEZ R. BACON
BY
Barnes, Kisselle, Raisch & Choate
ATTORNEYS June 5, 1962 J. R. BACON 3,037,892
MANUFACTURE OF LAMINATED PANELS
Filed Feb. 3, 1958 4 Sheets-Sheet 4

INVENTOR.
JABEZ R. BACON
BY
ATTORNEYS

United States Patent Office 3,037,892
Patented June 5, 1962

3,037,892
MANUFACTURE OF LAMINATED PANELS
Jabez R. Bacon, Farmington, Mich., assignor to Hydraulic Specialties, Inc., Detroit, Mich., a corporation of Michigan
Filed Feb. 3, 1958, Ser. No. 713,029
3 Claims. (Cl. 100—219)

This invention relates to the manufacture of laminated panels such as doors and particularly to an apparatus for applying a compressive force to a vertical stack of panels and maintaining the force thereon to permit the curing of the adhesive which laminates the panels.

At the present time in the manufacture of laminated doors and panels it is customary to stack the uncured panels in horizontal position on a platen and thereafter apply a pressure to the panels by a pressure-applying device such as a press. While the pressure is applied, clamps are applied to maintain the pressure on the stack after which the pressure-applying device is actuated to remove the pressure force. The compressed stack with the clamps is then placed in an oven for curing or permitted to cure in the atmosphere when air-setting adhesives are used. In one type of system which is presently being used, screw clamps are provided between the upper and lower platens.

A disadvantage of the present system is that considerable time and labor is involved in applying and removing the clamps. In addition, since the clamps are manually applied, it is impossible to tighten each clamp equally and uneven pressure is often obtained.

It is an object of this invention to provide an apparatus which will insure equal application of pressure to all portions of the vertical stack of panels.

It is a further object of this invention to provide an apparatus which will quickly produce a compressed stack of panels.

It is a further object of this invention to provide such an apparatus wherein the compressive force between the panels may be quickly released after curing.

It is a further object of this invention to provide such an apparatus which involves considerably less time and labor than has been heretofore required.

In the drawings:

FIG. 2 is a fragmentary side elevational view of the same.

FIG. 3 is a fragmentary side elevational view on an enlarged scale of a portion of the apparatus.

FIG. 4 is a fragmentary plan view of the portion of the apparatus shown in FIG. 3.

FIG. 5 is a fragmentary sectional view taken along the line 5—5 in FIG. 4 showing the parts in a different position.

FIG. 6 is a fragmentary elevational view on an enlarged scale showing the interengagement of the teeth on two of the parts.

FIG. 7 is a plan view similar to FIG. 4, parts being broken away.

FIG. 8 is a fragmentary elevational view similar to FIG. 2 showing the parts during assembly and disassembly.

Figure 1:
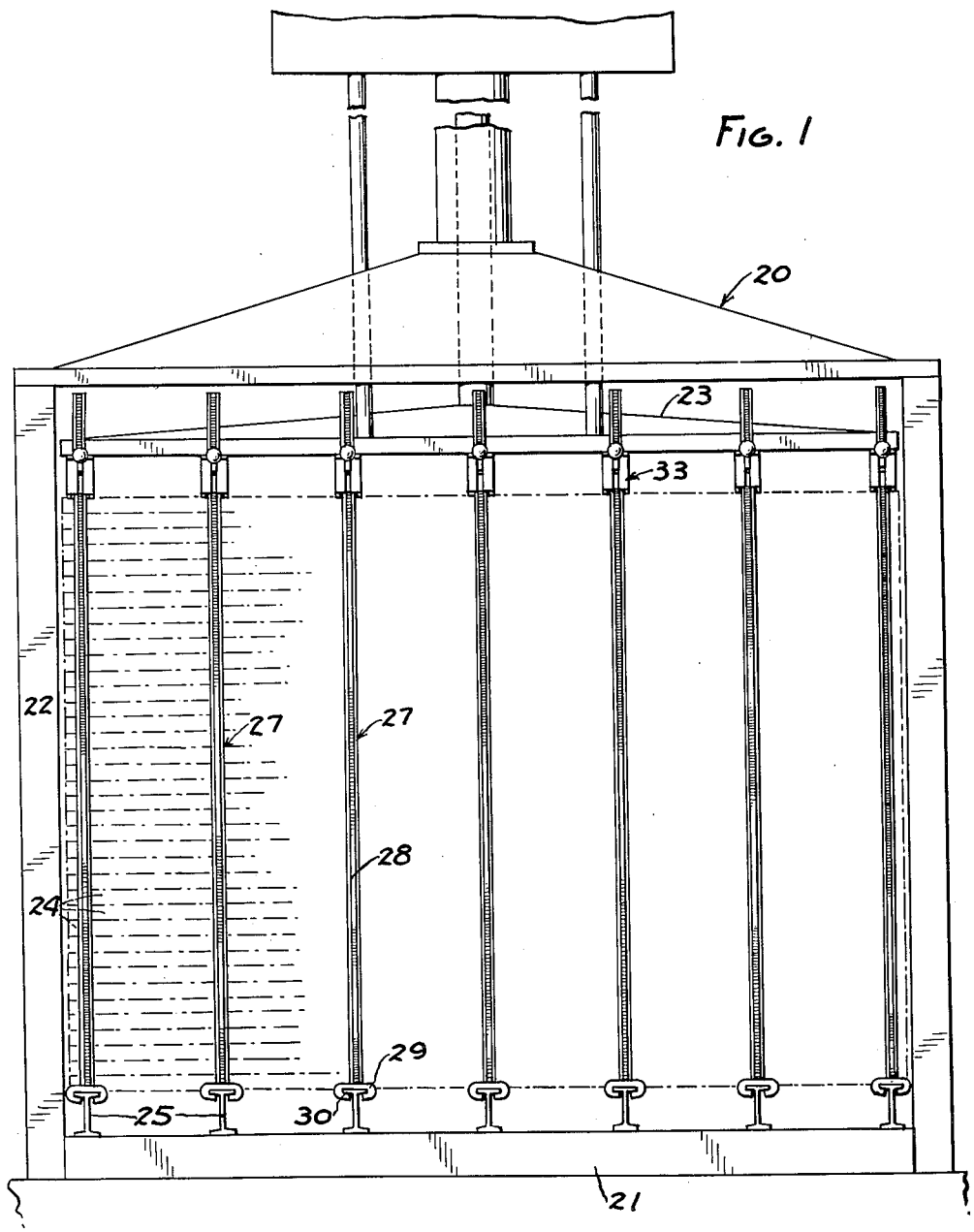
FIG. 1 is a fragmentary elevational view of the apparatus embodying the invention.

Referring to FIG. 1, hydraulic press 20 comprises a bed 21, frame 22 and a vertically reciprocable pressure-applying ram 23. The hydraulic press 20 is of conventional construction.

A lower platen for supporting a vertical stack of uncured laminated panels 24 is provided by a series of spaced parallel I beams 25. Each I beam 25 is placed in position resting on one of its flanges. An upper platen is provided over the vertical stack of panels 24 and comprises a second set of I beams 26, each resting on one of its flanges.

Clamping assemblies 27 are provided between the ends of each superimposed pair of vertically spaced I beams 25, 26. These clamping assemblies 27 are adapted to automatically hold the compressed stack of panels 24 in a compressed condition after the ram 23 is moved upwardly to relieve the pressure force. As shown in FIGS. 1 and 2, each clamping assembly 27 comprises a cylindrical rod 28 having a C-shaped member 29 on the lower end thereof which slips over the top flange 30 of an I beam 25 and thereby fastens the lower end of the rod 28 to its respective I beam.

The upper end of each rod 28 projects upwardly through a cylindrical opening 31 in the block 32 of ratchet assembly 33. Block 32 is generally rectangular and is removably engaged in a socket 34 in the end of the upper I beam 26. Socket 34 is formed by cutting away portions of the web 35 of the I beam and inserting side walls 36 and a base wall 37. Portions of the upper and lower flanges 38, 39 at the extremities of each I beam 26 are cut away to form an opening 40 to provide clearance for the rod so that the rod may move upwardly and downwardly.

As shown in FIGS. 3, 4, 5 and 8, the ratchet assembly 33 also includes a vertical slot 41 in block 32 which slot communicates with opening 31. A pawl member 42 having the thickness substantially equal to the width of the slot is pivoted in the slot by a pin 43 held in position by cotter pins 44 bearing against washers 45. Pawl member 42 comprises a pair of angularly spaced arms 46, 47.

Pin 43 passes through arm 46. Block 32 is also provided with a cylindrical seat 48 for receiving a coil spring 49 which bears against the underside of arm 47 of pawl 42 to yieldingly urge the arm in a counterclockwise direction, as viewed in FIG. 5, bringing the pawl toward the opening 31.

Each rod 28 is provided with a plurality of spaced teeth 50 extending longitudinally along the rod. Each pawl 42 is provided with a plurality of complementary teeth 51 in the area of juncture of arms 46, 47. With the rod extending through the opening 31, the spring 49 urges teeth 51 of pawl 42 into engagement with the teeth 50 on the rod. In the engaged position the arm 47 of pawl 42 extends generally horizontally (FIG. 3).

The teeth 50, 51 preferably have an included angle A of approximately 90° and the apexes of the teeth are flattened as at 52 (FIG. 6).

A handle 53 extends outwardly from arm 47 of pawl 42 and serves as a means for manipulating the pawl as presently described (FIG. 1).

In use, a plurality of I beams 25 is placed in spaced parallel relationship on bed 21 of the press to form the lower platen. The uncured panels 24 are then stacked on the platen formed by the I beams 25 and a second set of I beams is placed on top of the stack in spaced relationship and vertical alignment with the I beams 25. A clamp assembly 27 comprising a rod 28 and ratchet assembly 33 is then provided between each of the vertically spaced pairs of I beams 25, 26. The C-shaped member 29 on each clamp assembly is engaged with the upper flange 30 of I beam 25. With handle 53 depressed to disengage pawl 42 from rod 28, the ratchet assembly 33 is moved upwardly and downwardly on the rod 27 so that the block 32 of the ratchet assembly may be slipped into the socket 34 on the end of an upper I beam 26.

Ram 23 is then lowered onto the upper platen formed by the I beams 26 to compress the vertical stack of panels 24. As the ram 23 moves the I beams 26 downwardly, the pawl 42 of each ratchet assembly is caused to successively pivot outwardly out of contact with the teeth 50 on rod 28 over successive teeth and inwardly into engagement with successive teeth. Such an action is permitted by the spring 49 which only yieldingly opposes the movement of the pawl 42 outwardly away from rod 27. After the desired compression of the panels is obtained and the ram is moved upwardly, the pawls 42 maintain their engagement with the rods and the vertical stack is maintained in compressed condition. The stack, including the I beams 25, I beams 26 and clamp assemblies 27, may then be removed and placed in an oven for curing or in the atmosphere for curing, the entire stack being handled as an integral unit.

After curing, the clamp assemblies may be readily removed by pressing downwardly on each handle 53 to release the pawl 42 and permit each clamping assembly 27 to be removed.

Figure 9:
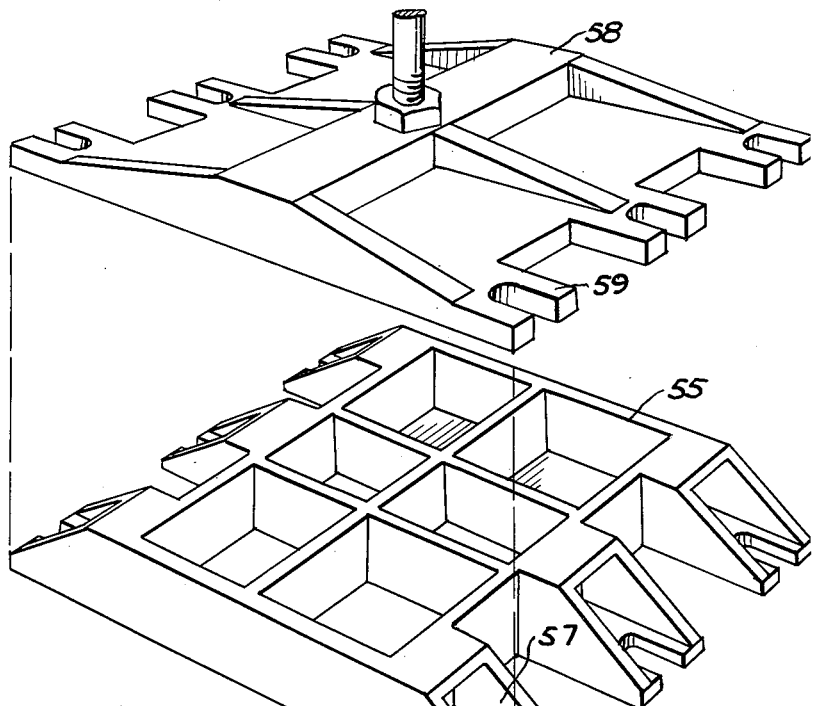
FIG. 9 is a perspective view of a portion of a modification of the invention.
Figure 10:
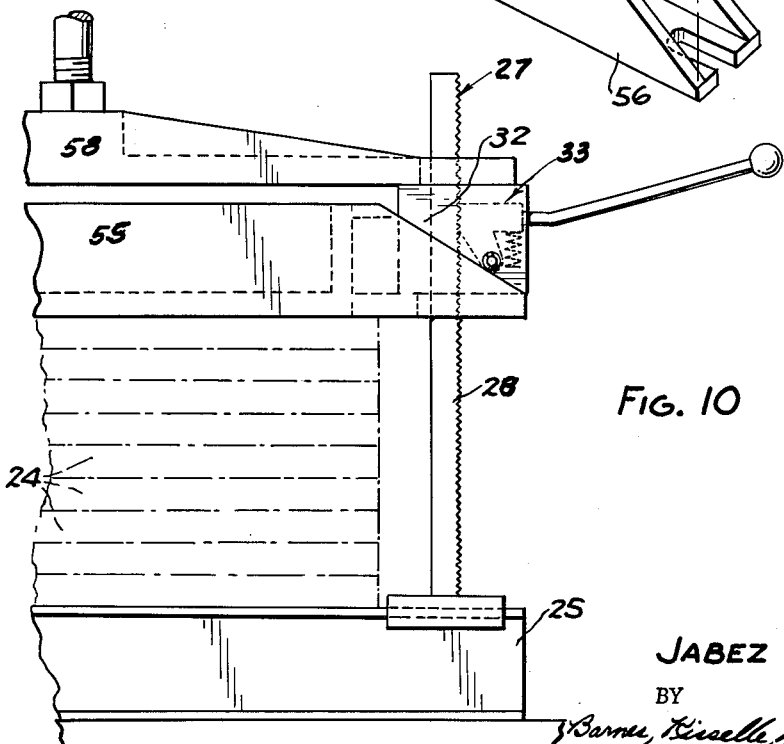
FIG. 10 is an elevational view of the modification of the invention.

A modified form of the invention is shown in FIGS. 9 and 10. This form is particularly adapted to be used with small presses. As shown in FIGS. 9 and 10, the lower platen is formed by I beams 25, as in the previous form of the invention. The upper platen 55 is a single piece unit having generally rectangular, laterally extending portions 56 which provide sockets 57 for receiving the blocks 32 of the ratchet assemblies. The ram 58 is provided with bifurcated portions 59 which surround the upper end of rod 28 so that, as the ram moves downwardly, the force is applied on the blocks 32 and the blocks 32, in turn, press against the projecting portions 56 of the upper platen 55 to apply the pressure force on the vertical stack of panels 24. The use of the clamping assemblies 27 in association with platen 55 and ram 56 is the same as in the previous form of the invention.

It can thus be seen that I have provided a system for readily applying a uniform force to a vertical stack of laminated panels. The force is applied automatically and no manual tightening or adjustment is required. After curing the clamping force may be quickly removed without the excessive expenditure of time or labor.

I claim:
1. In an apparatus for clamping laminated panels, the combination comprising an I beam for forming a portion of a lower platen on which laminated panels are stacked in horizontal position, an upper I beam adapted to be a part of an upper platen placed over the vertical stack of panels, a rod having a C-shaped hook on one end thereof for detachably engaging the flange on each end of one of said I beams, a ratchet assembly comprising a block detachably mounted on each end of said other of said I beams, said block having an opening therethrough through which the other end of said rod projects, the other of said I beams having a complementary socket at each end thereof for removably receiving said block, a pawl pivoted on said block, said rod having a plurality of vertically spaced teeth, a spring for yieldingly urging said pawl into engagement with said teeth, whereby when pressure is applied to said I beams to compress the vertical stack, said ratchet assembly successively engages the teeth on the rod to maintain the stack in compressed condition after the pressure force is released.

2. The combination set forth in claim 1 wherein said block has a vertical slot therein, said pawl being pivoted in said slot.

3. The combination set forth in claim 2 wherein said pawl comprises a generally L-shaped member forming two angularly spaced arms, said pawl being pivoted to said block at the extremity of one said arm, the other said arm being generally horizontal when said pawl is in engagement with teeth on said rod.

References Cited in the file of this patent

UNITED STATES PATENTS

| | | |
|---|---|---|
| 401,587 | Porter | Apr. 16, 1889 |
| 788,045 | Hammond | Apr. 25, 1905 |
| 1,707,135 | Ollesheimer | Mar. 26, 1929 |
| 1,766,773 | Bunker | June 24, 1930 |
| 2,442,422 | Loetscher | June 1, 1948 |
| 2,798,691 | Miller | July 9, 1957 |